United States Patent
Mongia et al.

(10) Patent No.: US 6,367,262 B1
(45) Date of Patent: Apr. 9, 2002

(54) MULTIPLE ANNULAR SWIRLER

(75) Inventors: Hukam Chand Mongia, West Chester; Gary Lee North; Claude Henry Chauvette, both of Cincinnati, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/675,665

(22) Filed: Sep. 29, 2000

(51) Int. Cl.[7] ............................................... F23R 3/60
(52) U.S. Cl. ........................................................ 60/748
(58) Field of Search .......................... 60/746, 747, 748

(56) References Cited

U.S. PATENT DOCUMENTS

| | | |
|---|---|---|
| 2,551,276 A | 4/1951 | McMahan |
| 2,968,925 A | 1/1961 | Blevans et al. |
| 3,302,399 A | 2/1967 | Tini et al. |
| 3,474,970 A | 10/1969 | Simmons et al. |
| 3,630,024 A | 12/1971 | Hopkins |
| 3,638,865 A | 2/1972 | McEneny et al. |
| 3,899,884 A | 8/1975 | Ekstedt |
| 3,980,233 A | 9/1976 | Simmons et al. |
| 4,105,163 A | 8/1978 | Davis, Jr. et al. |
| 4,198,815 A | 4/1980 | Bobo et al. |
| 4,418,543 A | 12/1983 | Faucher et al. |
| 4,584,834 A | 4/1986 | Koshoffer et al. |
| 4,726,192 A | 2/1988 | Willis et al. |
| 4,974,416 A | 12/1990 | Taylor |
| 5,020,329 A | 6/1991 | Ekstedt et al. |
| 5,321,950 A | 6/1994 | Shekleton et al. |
| 5,435,884 A | 7/1995 | Simmons et al. |
| 5,540,056 A | 7/1996 | Heberling et al. |
| 5,623,827 A | * 4/1997 | Monty ......................... 60/748 |
| 6,082,111 A | * 7/2000 | Stokes ......................... 60/737 |

OTHER PUBLICATIONS

U.S. Patent application Ser. No. 60/176,379, filed Jan. 14, 2000, entitled, "Method and Apparatus for Decreasing Combustor Emissions."

U.S. Patent application Ser. No. 09/054,794, filed Apr. 3, 1998, entitled, "Anti–Carboning Fuel–Air Mixer for a Gas Turbine Engine Combustor."

* cited by examiner

Primary Examiner—Charles G. Freay
Assistant Examiner—Ehud Gartenberg
(74) Attorney, Agent, or Firm—Andrew C. Hess; William Scott Andes

(57) ABSTRACT

A mixer for use in a combustion chamber of a gas turbine engine. The mixer includes a first fuel injector adapted for dispensing droplets of fuel during ignition and low power settings of the engine and a pilot swirler positioned upstream from the first fuel injector. The pilot swirler has a plurality of vanes for swirling air to mix air and the droplets of fuel. The mixer also includes a second fuel injector adapted for dispensing droplets of fuel during high power settings of the engine and a main swirler adjacent the pilot swirler and upstream from the second fuel injector. The main swirler has a plurality of vanes for swirling air traveling through the main swirler to mix air and the droplets of fuel dispensed by the second fuel injector. The mixer also includes a barrier positioned between the pilot swirler and main swirler for separating the first fuel injector from the second fuel injector.

17 Claims, 4 Drawing Sheets

MULTIPLE ANNULAR SWIRLER

The United States government has rights in this invention under Contract Nos. NAS3-26617 and NAS3-27720 awarded by the National Aeronautics & Space Administration.

BACKGROUND OF THE INVENTION

The present invention relates generally to gas turbine engine combustors, and more particularly to a combustor including a mixer having multiple injectors.

Fuel and air are mixed and burned in combustors of aircraft engines to heat flowpath gases. The combustors include an outer liner and an inner liner defining an annular combustion chamber in which the fuel and air are mixed and burned. A dome mounted at the upstream end of the combustion chamber includes mixers for mixing fuel and air. Ignitors mounted downstream from the mixers ignite the mixture so it burns in the combustion chamber.

Governmental agencies and industry organizations regulate the emission of nitrogen oxides (NOx), unburned hydrocarbons (HC), and carbon monoxide (CO) from aircraft. These emissions are formed in the combustors and generally fall into two classes, those formed due to high flame temperatures and those formed due to low flame temperatures. In order to minimize emissions, the reactants must be well mixed so that burning will occur evenly throughout the mixture without hot spots which increase NOx emissions or cold spots which increase CO and HC emissions. Thus, there is a need in the industry for combustors having improved mixing and reduced emissions.

Some prior art combustors such as rich dome combustors 10 as shown in FIG. 1 have mixers 12 which provide a rich fuel-to-air ratio adjacent an upstream end 14 of the combustor. Because additional air is added through dilution holes 16 in the combustor 10, the fuel-to-air ratio is lean at a downstream end 18 of a combustor opposite the upstream end 14. In order to improve engine efficiency and reduce fuel consumption, combustor designers have increased the operating pressure ratio of the gas turbine engines. However, as the operating pressure ratios increase, the combustor temperatures increase. Eventually the temperatures and pressures reach a threshold at which the fuel-air reaction occurs much faster than mixing. This results in local hot spots and increased NOx emissions.

Lean dome combustors 20 as shown in FIG. 2 have the potential to prevent local hot spots. These combustors 20 have two rows of mixers 22, 24 allowing the combustor to be tuned for operation at different conditions. The outer row of mixers 24 is designed to operate efficiently at idle conditions. At higher power settings such as takeoff and cruise, both rows of mixers 22, 24 are used, although the majority of fuel and air are supplied to the inner row of mixers. The inner mixers 22 are designed to operate most efficiently with lower NOx emissions at high power settings. Although the inner and outer mixers 22, 24 are optimally tuned, the regions between the mixers may have cold spots which produce increased HC and CO emissions.

SUMMARY OF THE INVENTION

Among the several features of the present invention may be noted the provision of a mixer for use in a combustion chamber of a gas turbine engine. The mixer includes a first fuel injector adapted for dispensing droplets of fuel during ignition and low power settings of the engine and a pilot swirler positioned upstream from the first fuel injector. The pilot swirler has a plurality of vanes for swirling a first volume of air traveling through the pilot swirler to mix the first volume of air and the droplets of fuel dispensed by the first fuel injector to form a first fuel-air mixture selected for optimal burning during ignition and low power settings of the engine. The mixer also includes a second fuel injector adapted for dispensing droplets of fuel during high power settings of the engine and a main swirler adjacent the pilot swirler and upstream from the second fuel injector. The main swirler has a plurality of vanes for swirling a second volume of air traveling through the main swirler to mix the second volume of air and the droplets of fuel dispensed by the second fuel injector to form a second fuel-air mixture selected for optimal burning during high power settings of the engine. The mixer also includes a barrier positioned between the pilot swirler and main swirler for separating the first fuel injector from the second fuel injector.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
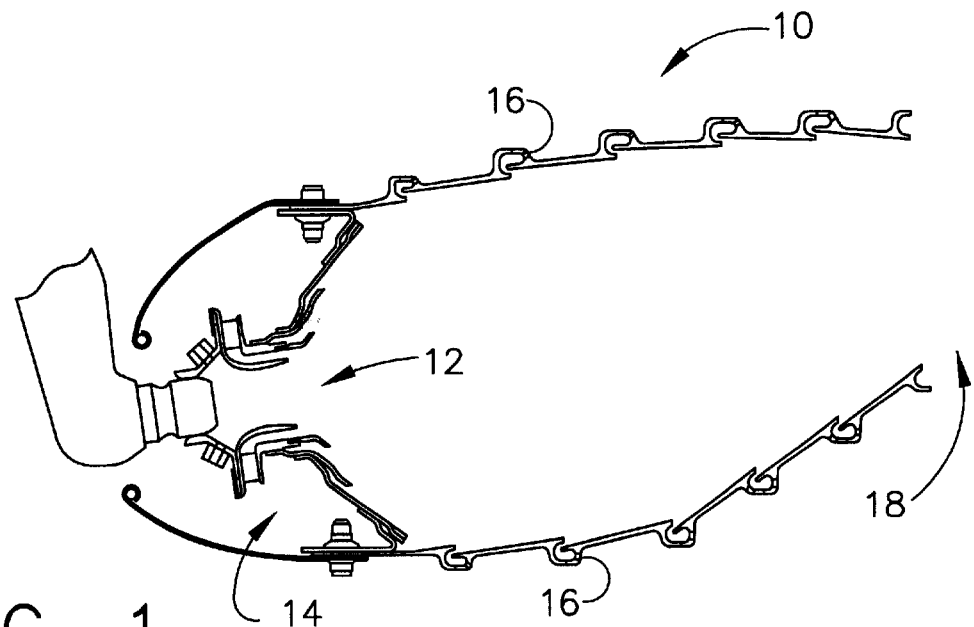
FIG. 1 is a vertical cross section of a conventional rich dome combustor.
Figure 2:
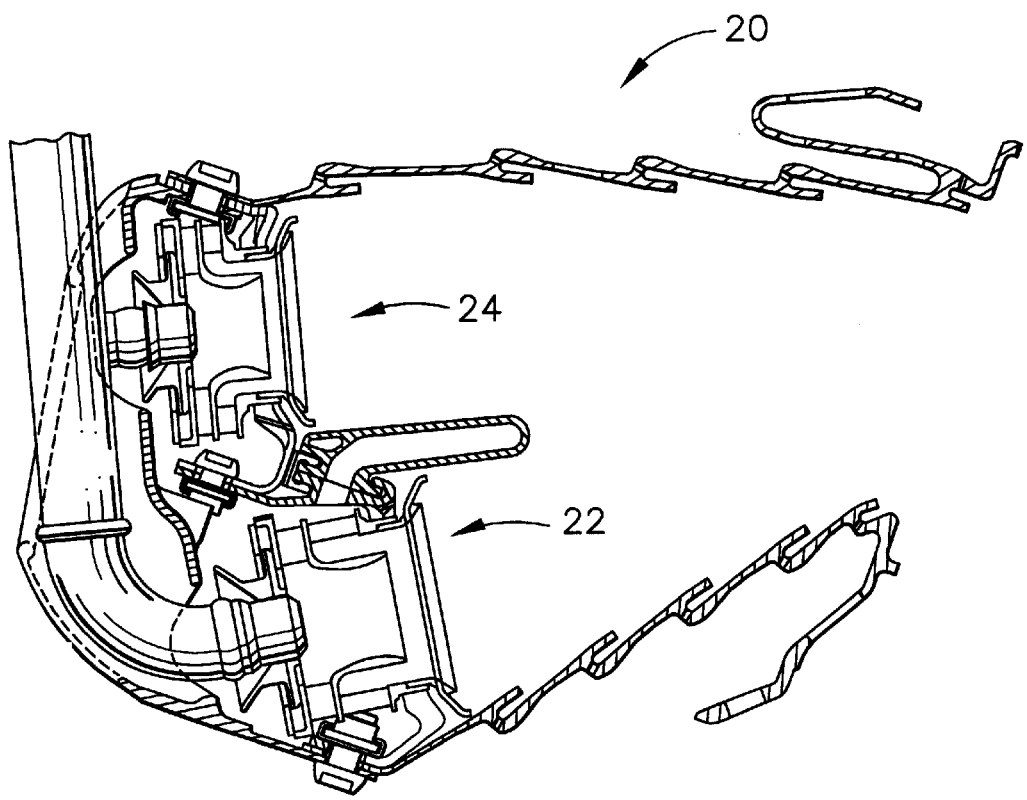
FIG. 2 is a vertical cross section of a conventional lean dome combustor.
Figure 3:
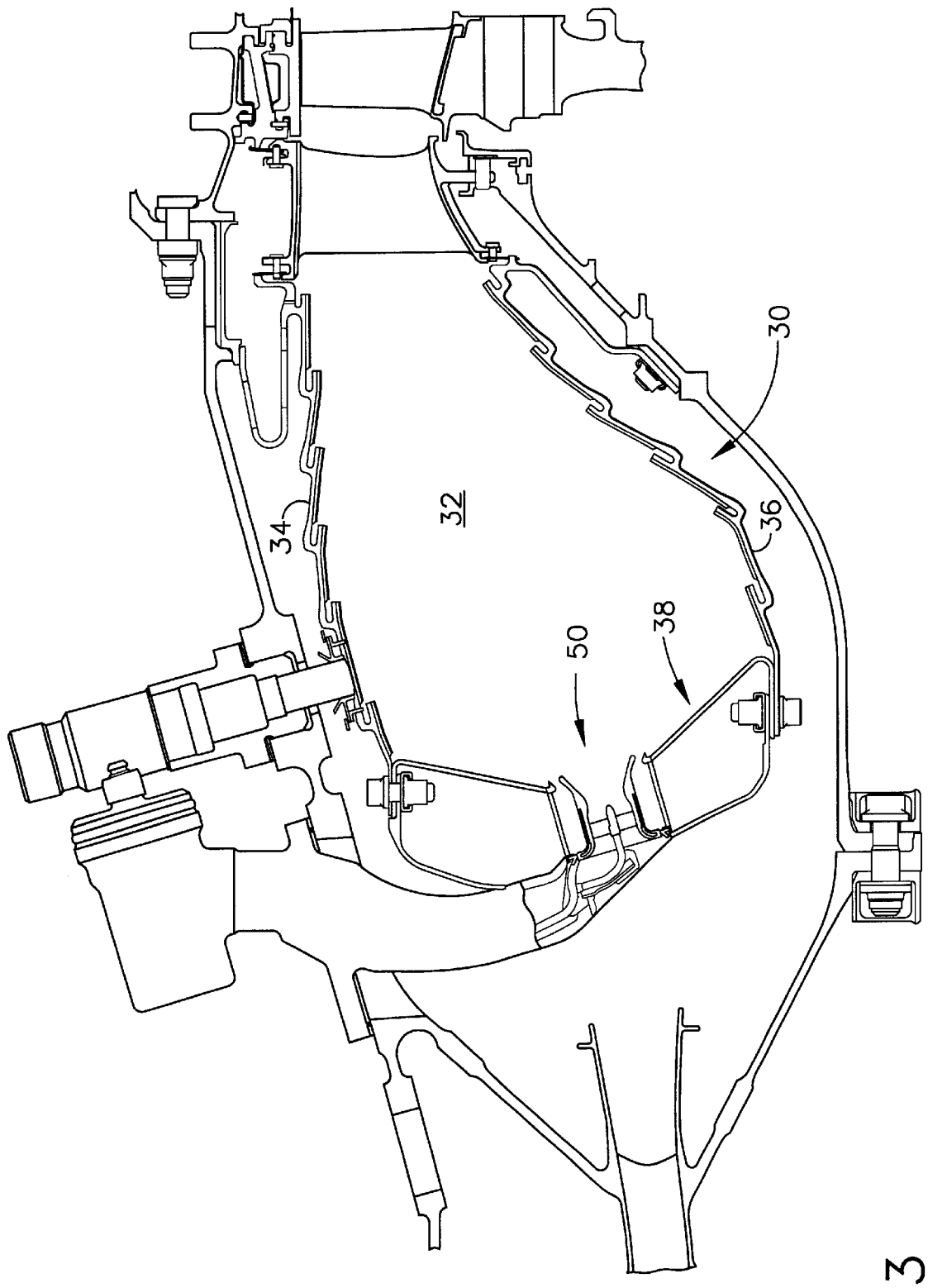
FIG. 3 is a vertical cross section of a combustor of the present invention.

Referring to the drawings and in particular to FIG. 3, a combustor of the present invention is designated in its entirety by reference number 30. The combustor 30 has a combustion chamber 32 in which combustor air is mixed with fuel and burned. The combustor 30 includes an outer liner 34 and an inner liner 36. The outer liner 34 defines an outer boundary of the combustion chamber 32, and the inner liner 36 defines an inner boundary of the combustion chamber. An annular dome, generally designated by 38, mounted upstream from the outer liner 34 and the inner liner 36 defines an upstream end of the combustion chamber 32. Mixers of the present invention, generally designated 50, are positioned on the dome 38. The mixers 50 deliver a mixture of fuel and air to the combustion chamber 32. Other features of the combustion chamber 30 are conventional and will not be discussed in further detail.

Figure 4:
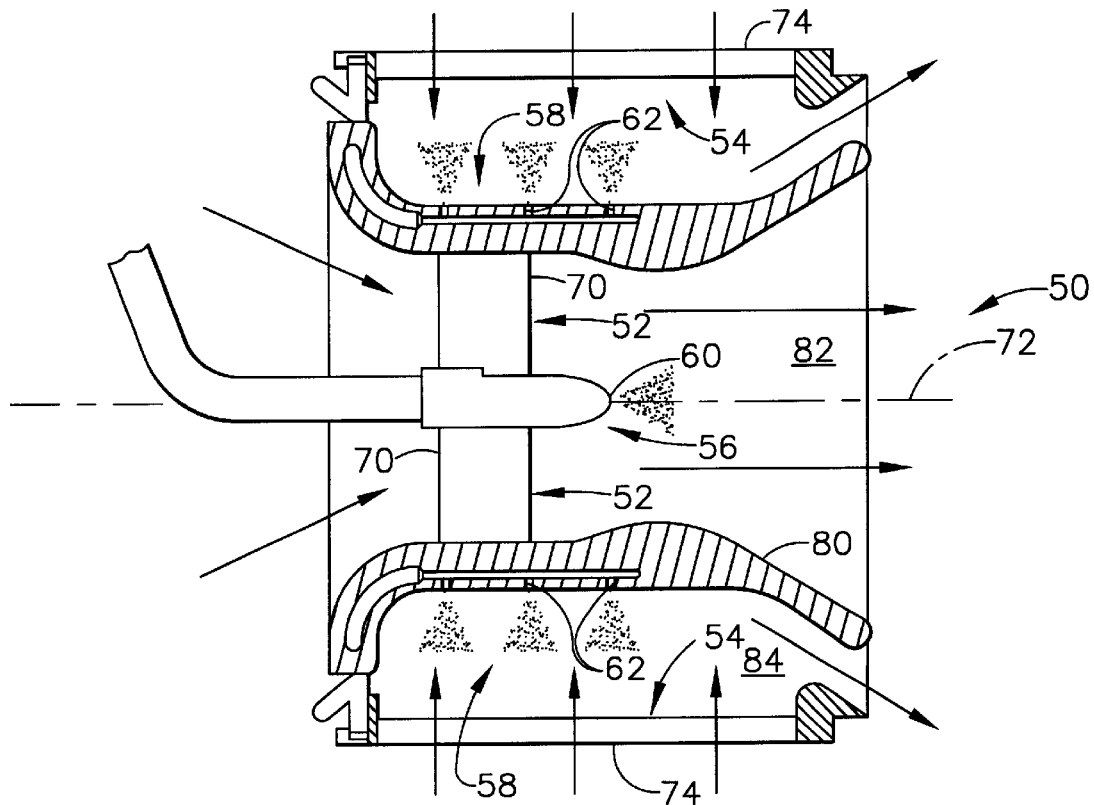
FIG. 4 is a vertical cross section of a mixer of a first embodiment of the present invention.

As illustrated in FIG. 4, each mixer 50 generally comprises a pilot swirler, generally designated by 52, and a main swirler, generally designated by 54, surrounding the pilot swirler. A first fuel injector, generally designated by 56, is positioned downstream from the pilot swirler 52, and a second fuel injector, generally designated by 58, is positioned downstream from the main swirler 54. The first injector 56 includes a centrally positioned fuel injector port 60 adapted for dispensing droplets of fuel during ignition and low power settings of the engine. The second injector 58 includes a plurality of fuel injector ports 62 adapted for dispensing droplets of fuel during high power settings of the engine.

The pilot swirler 52 has a plurality of vanes 70. Although the pilot swirler 52 may have other configurations without departing from the scope of the present invention, in the embodiment shown in FIG. 4 the swirler is an axial swirler. Thus, each of the vanes 70 is skewed relative to a centerline 72 of the mixer 50 for swirling air traveling through the pilot swirler 52 so it mixes with the droplets of fuel dispensed by the first fuel injector 56 to form a first fuel-air mixture selected for optimal burning during ignition and low power settings of the engine. Although the main swirler 54 may have other configurations without departing from the scope of the present invention, in the embodiment shown in FIG. 4 the main swirler is a radial swirler having a plurality of radially skewed vanes 74 for swirling air traveling through the swirler to mix the air and the droplets of fuel dispensed by the second fuel injector 58 to form a second fuel-air mixture selected for optimal burning during high power settings of the engine.

An annular barrier, generally designated by 80, is positioned between the pilot swirler 52 and the main swirler 54. This barrier 80 defines an outer boundary of a pilot mixing chamber 82 downstream from the pilot swirler 52 and an inner boundary of an annular main mixing chamber 84 downstream from the main swirler 54. The plurality of fuel injector ports 62 of the second fuel injector 58 are arranged in three circles on the barrier 80 concentric with the mixer centerline 72 and are directed outward to dispense droplets of fuel into the main mixing chamber 84.

Figure 5:
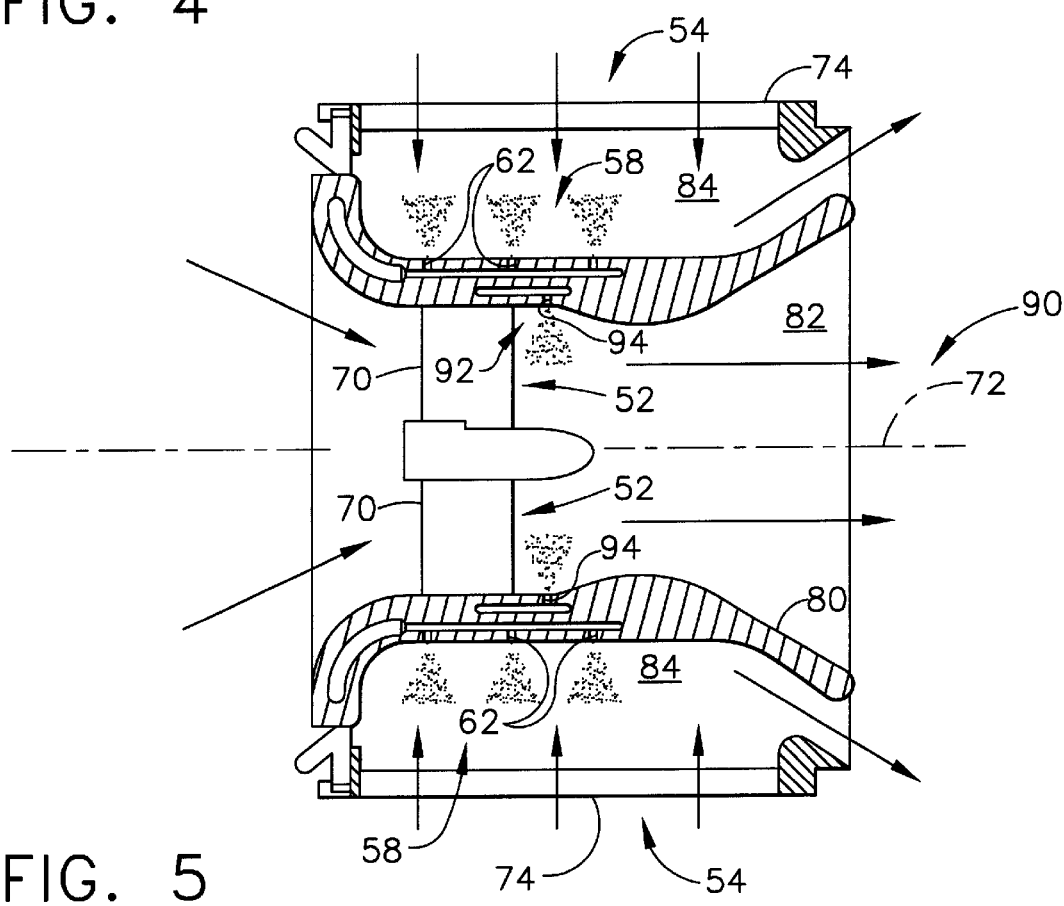
FIG. 5 is a vertical cross section of a mixer of a second embodiment of the present invention.

As illustrated in FIG. 5, a second embodiment of the mixer, generally designated by 90, has a first fuel injector 92 having a plurality of fuel injector ports 94. The ports 94 are arranged in a circle on the barrier 80 concentric with the mixer centerline 72 and are directed inward to dispense droplets of fuel into the pilot mixing chamber 82. It is believed that this arrangement may as provide cooling advantages over the single port configuration of the mixer 50 of the first embodiment. The mixer 90 of the second embodiment is identical to the mixer 50 of the first embodiment in all other respects and will no not be described in further detail.

Figure 6:
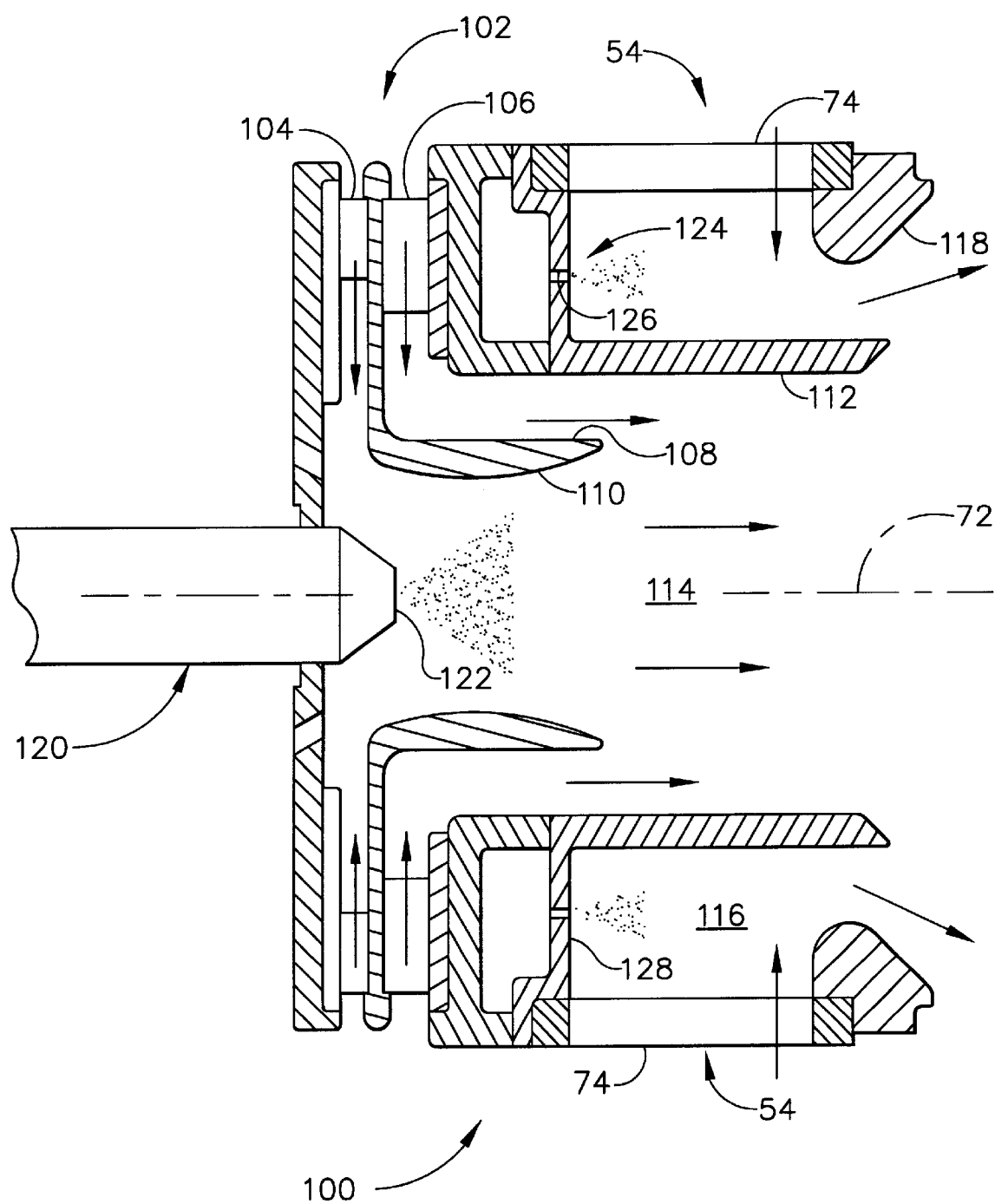
FIG. 6 is a vertical cross section of a mixer of a third embodiment of the present invention.

FIG. 6 illustrates a mixer of a third embodiment, generally designated by 100. The mixer 100 includes pilot swirler, generally designated by 102, having two sets of radially skewed vanes 104, 106 which may be configured alternatively to swirl air in the same direction or in opposite directions. A first barrier 108 having a converging-diverging inner surface 110 separates air flowing through the first and second sets of vanes 104, 106. As will be appreciated by those skilled in the art, the converging-diverging inner surface 110 provides a fuel filming surface to aid inflow power performance. A second barrier 112 having a generally cylindrical configuration separates a pilot mixing chamber 114 from a main mixing chamber 116 of the mixer 100. The main mixing chamber 116 has a diverging outer housing 118 at its exit for directing air away from the pilot mixing chamber 114 to reduce the potential for lean blowout. Further, the mixer 100 includes a first injector, generally designated by 120, having a centrally positioned fuel injector port 122 adapted for dispensing droplets of fuel during ignition and low power settings of the engine and a second injector, generally designated by 124, having a plurality of fuel injector ports 126 adapted for dispensing droplets of fuel during high power settings of the engine. The fuel injector ports 126 of the second injector 124 are arranged in a circle on a forward wall 128 of the main mixing chamber 116 concentric with the mixer centerline 72. As will be appreciated by those skilled in the art, positioning the ports 126 on the forward wall 128 rather than on the second barrier 112 permits the barrier to have a smaller outer diameter and minimizes the fuel injector size. Other features of the mixer 100 of the third embodiment are similar to those described above with respect to the mixers of the first and second embodiments and will not be described in further detail.

The mixers of the present invention eliminate many problems associated with dual annular combustors. Instead of positioning the pilot and main stages of the combustor in separate domes, creating a significant CO quench zone at the interface, the mixers of the present invention provide concentric and distinct pilot and main mixing chambers. At low power, only the pilot mixing chamber is fueled. Because the air traveling through the pilot mixing chamber is separated from air traveling through the main mixing chamber, the fuel-air reaction proceeds to completion with minimal CO or HC emissions. At high power, fuel is injected into both mixing chambers through a plurality of injectors so the pilot and main stage fuel-air ratios are optimized for minimal emissions. In this way, the advantages of staging are realized and optimal fuel-air ratios are maintained locally without the penalty of poor thermal profiles and pattern factors in the combustor.

The barriers separating the pilot and main mixing chambers of the present invention physically shelter the pilot mixing chamber from the air exiting the main mixing chamber, allowing the pilot to be designed for optimal performance during pilot only operation. Because the barrier separates flames in the pilot mixing chamber from the air passing through the main mixing chamber there is minimal interaction between mixing chambers until the reaction has gone to completion. This separation allows the pilot mixer to be designed for optimum performance at idle with minimal CO and HC emissions and excellent lean blowout characteristics.

Further, the main mixing chambers are designed to achieve low NOx under high power conditions by maximizing mixing. As will be appreciated by those skilled in the art, the exits of the main mixing chambers have a smaller diameter than the vanes of the main swirlers to encourage swirl. In addition, the mixers of the first and second embodiments have (i.e., main) fuel injectors with injection ports positioned at several axial positions along the main mixing chamber to provide flexibility in adjusting radial mixing to achieve low NOx and complete combustion under variable conditions. Still further, the large number of injector ports provides adequate circumferential mixing under all conditions.

Initial testing of the mixer 50 of the first embodiment indicates the mixer has improved low power performance, stability and emissions over dual annular combustors.

It is envisioned that the fuel injectors described above may include an air blast nozzle such as described in U.S. Pat. No. 5,435,884, which is hereby incorporated by reference.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A mixer for use in a combustion chamber of a gas turbine engine, said mixer comprising:
   a first fuel injector adapted for dispensing droplets of fuel during ignition and low power settings of the engine;
   a pilot swirler positioned upstream from said first fuel injector having a plurality of vanes for swirling a first volume of air traveling through said pilot swirler to mix said first volume of air and the droplets of fuel dispensed by said first fuel injector to form a first fuel-air mixture selected for optimal burning during ignition and low power settings of the engine;
   a second fuel injector adapted for dispensing droplets of fuel during high power settings of the engine;
   a main swirler surrounding said pilot swirler and upstream from said second fuel injector having a plurality of vanes for swirling a second volume of air traveling through said main swirler to mix said second volume of air and the droplets of fuel dispensed by said second fuel injector to form a second fuel-air mixture selected for optimal burning during high power settings of the engine; and
   an annular barrier positioned between said pilot swirler and said main swirler for separating said first fuel injector from said second fuel injector, said barrier defining a pilot mixing chamber downstream from said pilot swirler and partially defining an annular main mixing charter downstream from said main swirler.

2. A mixer as set forth in claim 1 wherein said pilot swirler is an axial swirler.

3. A mixer as set forth in claim 2 wherein said main swirler is a radial swirler.

4. A mixer as set forth in claim 1 wherein said pilot swirler is a radial swirler.

5. A mixer as set forth in claim 4 wherein said main swirler is a radial swirler.

6. A mixer as set forth in claim 1 wherein said second fuel injector includes a plurality of fuel injector ports positioned in the barrier.

7. A mixer as set forth in claim 1 wherein said first fuel injector includes a fuel injector port centrally positioned inside the barrier.

8. A mixer for use in a combustion chamber of a gas turbine engine, said mixer comprising:
   a first fuel injector adapted for dispensing droplets of fuel during ignition and low power settings of the engine;
   a pilot swirler positioned upstream from said first fuel injector having a plurality of vanes for swirling a first volume of air traveling through said pilot swirler to mix said first volume of air and the droplets of fuel dispensed by said first fuel injector to form a first fuel-air mixture selected for optimal burning during ignition and low power settings of the engine;
   a second fuel injector adapted for dispensing droplets of fuel during high power settings of the engine;
   a main swirler adjacent said pilot swirler and upstream from said second fuel injector having a plurality of vanes for swirling a second volume of air traveling through said main swirler to mix said second volume of air and the droplets of fuel dispensed by said second fuel injector to form a second fuel-air mixture selected for optimal burning during high power settings of the engine; and
   a barrier positioned between said pilot swirler and said main swirler for separating said first fuel injector from said second fuel injector, wherein said first fuel injector includes a plurality of fuel injector ports arranged in a circle in the barrier.

9. A mixer as set forth in claim 1 in combination with a combustion chamber comprising:
   an annular outer liner defining an outer boundary of the combustion chamber;
   an annular inner liner mounted inside the outer liner defining an inner boundary of the combustion chamber; and
   an annular dome mounted upstream from the outer liner and the inner liner defining an upstream end of the combustion chamber, said mixer being positioned on the dome for delivering a mixture of fuel and air to the combustion chamber.

10. A mixer as set forth in claim 8 wherein said pilot swirler is an axial swirler.

11. A mixer as set forth in claim 10 wherein said main swirler is a radial swirler.

12. A mixer as set forth in claim 8 wherein said pilot swirler is a radial swirler.

13. A mixer as set forth in claim 12 wherein said main swirler is a radial swirler.

14. A mixer as set forth in claim 8 wherein said main swirler surrounds said pilot swirler, and the barrier is an annular barrier positioned between said main swirler and said pilot swirler so that the barrier defines a pilot mixing chamber downstream from said pilot swirler and partially defines an annular main mixing chamber downstream from said main swirler.

15. A mixer as set forth in claim 14 wherein said second fuel injector includes a plurality of fuel injector ports positioned in the barrier.

16. A mixer as set forth in claim 8 wherein said first fuel injector includes a fuel injector port centrally positioned inside the barrier.

17. A mixer as set forth in claim 8 in combination with a combustion chamber comprising:
   an annular outer liner defining an outer boundary of the combustion chamber;
   an annular inner liner mounted inside the outer liner defining an inner boundary of the combustion chamber; and
   an annular dome mounted upstream from the outer liner and the inner liner defining an upstream end of the combustion chamber, said mixer being positioned on the dome for delivering a mixture of fuel and air to the combustion chamber.

* * * * *